July 26, 1927.

A. BOTHE 1,637,100

PAPER BAKING PLATE

Filed Aug. 11, 1926

WITNESS:
Robt R Kitchel.

INVENTOR
Andreas Bothe
BY
Augustus B. Stoughton.
ATTORNEY.

Patented July 26, 1927.

1,637,100

UNITED STATES PATENT OFFICE.

ANDREAS BOTHE, OF ORELAND, PENNSYLVANIA, ASSIGNOR TO KLEEN PRODUCTS COMPANY, INC., OF NORTH WALES, PENNSYLVANIA, A CORPORATION OF DELAWARE.

PAPER BAKING PLATE.

Application filed August 11, 1926. Serial No. 128,667.

The principal object of the present invention is to provide a baking plate of paper which shall be square at the top or rim and either square or round at the bottom and to which the article baked will not adhere so that the article can be readily removed from the plate without breaking the article although it may completely fill the plate.

To this and other ends hereinafter set forth the invention comprises a paper plate consisting of one piece and of square or rectangular form at the top or rim and smooth at its interior surface and having rounded, smooth surfaces at the corners of its interior, the fibers of the paper of the plate being displaced, stretched or shifted at the rim and corners and at points intermediate of the corners.

The invention also comprises the improvements to be presently described and finally claimed.

In the following description reference will be made to the accompanying drawing forming part hereof and in which—

Figure 1:
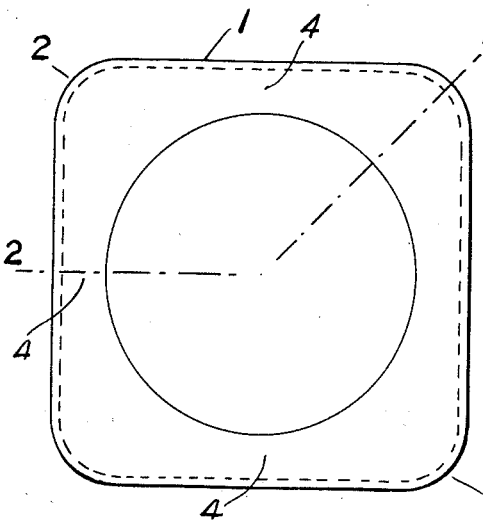

Figure 1 is a top or plan view of a plate embodying features of the invention and having a round bottom.

Figure 3:
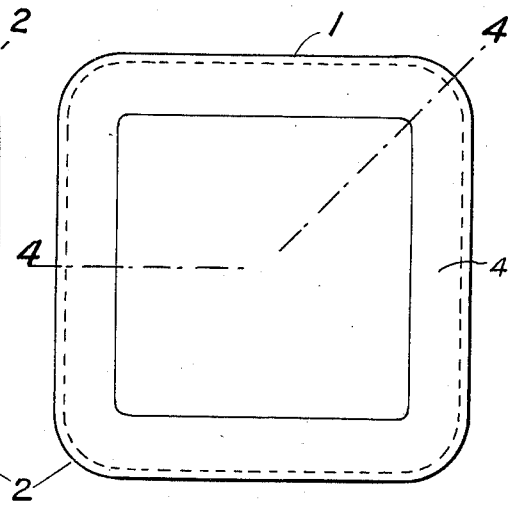
Figure 2:
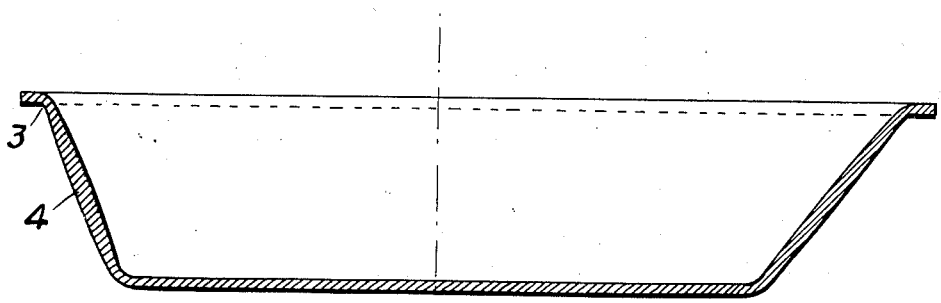
Figure 4:
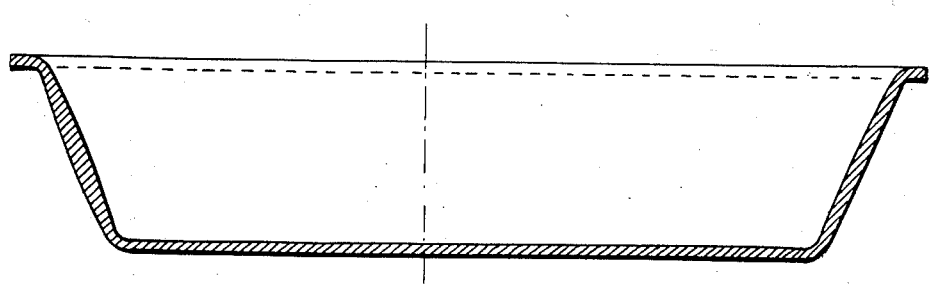

Fig. 2 is a transverse sectional view of the same taken on the line 2—2 of Fig. 1 and drawn to an enlarged scale, and Figs. 3 and 4 are views similar to Figs. 1 and 2 illustrating a modification.

In the drawing, referring more particularly to Figs. 1 and 2, the plate consists of a single piece of paper or the like. In outline the rim 1 of the bowl is square. The entire internal surface of the bowl is smooth and the corners 2 are rounded. The fibers of the paper are shifted as indicated at 3 in Fig. 2, so that the rim is somewhat thicker than the adjacent portions of the bowl, thus imparting stiffness to the rim, and the fibers are shifted as at 4, Fig. 2, thickening up the wall of the bowl and also imparting strength. At the rounded corners there is also a shifting of the fibers.

The baking plate is made from a rectangular sheet of paper compressed into dish form and the relative disposition of the fibers makes possible the smooth internal surface and the rounded or curved form at the corners and also the generally square form of the rim. The smooth surface and the rounded corners permit of the use of the plates as baking plates, so that the dough, batter or the like can be put into the plates and baked and then readily removed which would not be the case if the corners of the plates were angular or if the walls of the plates were folded, corrugated or fluted.

The construction and characteristics of the modification illustrated in Figs. 3 and 4 are as above described except that the bottom of the mold is of square instead of circular contour.

I claim:

A baking plate consisting of a single rectangular sheet of paper compressed into dish shape and having a bowl, a rim rectangular in outline, a smooth interior surface, and rounded corners, the fibers of the paper by redistribution affording the smooth interior surface and the rectangular shape and the rounded corners.

ANDREAS BOTHE.